US006992165B2

(12) United States Patent
Hedges

(10) Patent No.: US 6,992,165 B2
(45) Date of Patent: Jan. 31, 2006

(54) METHOD FOR MAKING AMINE-TERMINATED POLYARYLENE POLYETHERS

(75) Inventor: Winston Lee Hedges, Livermore, CA (US)

(73) Assignee: HEXCEL Corporation, Dublin, CA (US)

( * ) Notice: Subject to any disclaimer, the term of this patent is extended or adjusted under 35 U.S.C. 154(b) by 45 days.

(21) Appl. No.: 10/740,095

(22) Filed: Dec. 17, 2003

(65) Prior Publication Data

US 2005/0137378 A1  Jun. 23, 2005

(51) Int. Cl.
*C08G 75/00* (2006.01)

(52) U.S. Cl. .................. 528/172; 528/175; 528/210; 528/218; 528/219; 528/491; 528/501; 528/502 R; 528/503

(58) Field of Classification Search .............. 528/172, 528/175, 210, 218, 219, 491, 501, 502 R, 528/503
See application file for complete search history.

(56) References Cited

U.S. PATENT DOCUMENTS

| 3,539,655 A | 11/1970 | Strachan et al. |
| 3,563,951 A | 2/1971 | Radlmann et al. |
| 3,895,064 A | 7/1975 | Brode et al. |
| 3,920,768 A | 11/1975 | Kwiatkowski |
| 4,108,837 A | 8/1978 | Johnson et al. |
| 4,275,186 A | 6/1981 | Kawakami et al. |
| 4,400,499 A | 8/1983 | Colon |
| 4,789,722 A | 12/1988 | Jabloner et al. |

FOREIGN PATENT DOCUMENTS

EP  0130270 A  1/1985

OTHER PUBLICATIONS

J.B. Ibieta, D.S. Kalika, and L.S. Penn, *Chain End Analysis of Bisphenol A Polysulfone and Its Relation to Molecular Weight,* Journal of Polymer Science: Part A: Polymer Chemistry, vol. 36 1309-1316 (1998).

*Primary Examiner*—Duc Truong
(74) *Attorney, Agent, or Firm*—W. Mark Bielawski; David J. Oldenkamp

(57) ABSTRACT

A method for making an amine-terminated polyarylene polyether thermoplastic in which a liquid/solid slurry reaction mixture is formed in an oxygen-free atmosphere. The reaction mixture is composed of a dihydroxyaromatic compound, a dihaloaromatic compound, an amino-hydroxyaromatic compound, a weak base, an aprotic polar solvent and a non-aromatic azeotrope former which is substantially imiscible with the aprotic polar solvent, said azeotrope former consisting of a molecule which has from 6 to 10 carbon atoms. The reaction mixture is refluxed at an elevated temperature to eventually produce a solution of the amine-terminated polyarylene polyether in the polar solvent. The method is designed for use in producing large amounts of thermoplastic in a simple, efficient and reliable manner.

15 Claims, No Drawings

METHOD FOR MAKING AMINE-TERMINATED POLYARYLENE POLYETHERS

BACKGROUND OF THE INVENTION

1. Field of the Invention

The present invention relates generally to methods for making polyarylene polyethers. More particularly, the present invention is directed to methods for making polyarylene polyethers where a bis-halobenzenoid compound or a dihaloaromatic compound and the double salt of a bis-hyroxybenzenoid compound or a dihydroxyaromatic compound are reacted in the presence of an aprotic polar solvent and an azeotrope former to produce a polyarylene polyether. Even more particularly, the present invention involves methods for making low molecular weight amine-terminated polyarylene polyethers.

2. Description of Related Art

Polyarylene polyethers are well-known and widely available thermoplastic resins. A conventional method for making polyarylene polyethers involves condensing substantially equimolar amounts of a bis-haloaromatic or dihaloaromatic compound (hereafter dihaloaromatic compound) and the double salt of a bisphenol or a dihydroxyaromatic compound (hereafter dihydroxyaromatic compound) in a reaction medium that includes an aprotic polar solvent and a compound capable of forming an azetrope with water. The azeotrope former is provided to help in removing water that is generated during the formation of the double salt of the dihydroxyaromatic compound. Exemplary methods for making high molecular weight polyarylene polyethers are described in U.S. Pat. No. 4,108,837.

Methods have been developed for making low molecular weight polyarylene polyethers that have a low degree of polymerization (Dp): For example, U.S. Pat. No. 4,275,186 describes a method for making hydroxy-terminated polyarylene polyethers having a low degree of polymerization. The method is similar to U.S. Pat. No. 4,108,837 except that a molar excess of the double salt of the dihydroxyaromatic compound is used.

Methods have also been developed for making low molecular weight polyarylene polyethers that are halogen-terminated. Typically, these procedures involve using an excess of dihaloaromatic compound in the reaction mixture. U.S. Pat. No. 3,539,655 and U.S. Pat. No. 3,563,951 describe procedures for making such halogen-terminated polyarylene polyethers. In addition, methods have been developed for making low molecular weight amine-terminated polyarylene polyethers by reacting an aminophenolate with a halogen-terminated polyarylene polyether or by reacting an aminophenolate with the reaction mixture used to make the halogen-terminated polyarylene polyether. Exemplary procedures are set forth in U.S. Pat. No. 3,895,064 and U.S. Pat. No. 3,920,768.

The methods for making polyarylene polyethers described in the above-identified patents were well suited for their intended purposes. However, numerous problems were encountered in trying to use these methods to reliably produce large amounts of polyarylene polyethers on an industrial scale and at a cost that was economically feasible.

In U.S. Pat. No. 4,789,722, a method was disclosed for making low Dp polyarylene polyethers wherein a dihydroxyaromatic compound and a strong and a relatively weak base are combined in a liquid reaction medium at 100° C.–200° C. to form a double salt that is then reacted with a slight molar excess of dihaloaromatic compound bearing two replaceable halogens. The method reliably produces halogen-terminated polyarylene polyethers of select degrees of polymerization and desirable correspondence between weight and number average molecular weights. In subsequent steps amine-terminated polyarylene polyethers are made using the strong and weak bases. The resulting amine-terminated polyethers have a low, select degree of polymerization, desirable correspondence between weight and number average molecular weight and a high level of amine termination.

The methods described in U.S. Pat. No. 4,789,722 have been routinely used to produce the large amounts of amine-terminated polyarylene polyethers that are required for industrial production. This has been accomplished in a relatively reliable and cost effective manner. However, as is the case with any complex large-scale industrial production process, there is always room for improvement. Accordingly, there is a continuing need to develop new methods for producing amine-terminated polyarylene polyethers that improve upon the reliability and/or efficiency of large-scale production of this commercially important thermoplastic material.

SUMMARY OF THE INVENTION

The present invention provides a method for making amine-terminated polyarylene polyethers that is simple, efficient and sufficiently reliable to be used to produce finished product on an industrial scale. The invention is based in part on the discovery that the two-step reaction procedure as taught by U.S. Pat. No. 4,108,837 can be eliminated in favor of a single batch type reaction method where all of the starting reaction ingredients are charged into a single reactor. The invention reduces by over one half the amount of equipment required to manufacture the amine-terminated polyarylene polyethers. In addition, the batch cycle time required to complete the polymer synthesis is reduced. The invention is also based in part on the discovery that the strong base required in the prior two-step reaction procedure can be eliminated. This means that the specialized nickel-plated reaction vessels that were previously required due to the caustic properties of the strong base are no longer necessary.

The present invention involves first forming a liquid/solid slurry reaction mixture in a reaction vessel that has an oxygen-free atmosphere. The reaction mixture is made up of a dihydroxyaromatic compound, a dihaloaromatic compound, an amino-hydroxyaromatic compound, a weak base, an aprotic polar solvent and a non-aromatic azeotrope former which has from 6 to 10 carbon atoms. The reaction mixture is then heated to an elevated temperature that is sufficient to form a heated reaction mixture and a vapor mixture that is composed of the polar solvent, the non-aromatic azeotrope former, and the water generated as a by-product of the polymer synthesis. The vapor mixture that is distilled from the heated reaction mixture is continually removed from the reaction vessel. During the course of the reaction, the heated reaction mixture is replenished with the non-aromatic azeotrope former. The heated reaction mixture is maintained at the elevated temperature for a time that is sufficient to form a product mixture that includes the amine-terminated polyarylene polyether, the polar solvent and the non-aromatic azeotrope former. The non-aromatic azeotrope former and the inorganic salts present in the product mixture are then separated from the product mixture to provide a solution of the final amine-terminated polyarylene polyether in the aprotic polar solvent.

As a feature of the present invention, water is not added to the reaction mixture. The weak base is added in the form of a solid. Accordingly, only the water that is generated as a by-product during the reaction must be removed from the reaction mixture. This is in contrast to the prior procedures that introduce water into the reaction mixture as the carrier solvent for the strong base. Another advantage of starting the reaction in the absence of water is that all of the ingredients required to form the amine-terminated polyarlylene polyether can be charged into the reaction vessel at the same time.

As further feature of the present invention, the non-aromatic azeotrope former is not miscible with the aprotic polar solvent. As a result, the azeotrope former is able to efficiently remove water from the reaction mixture without inhibiting the polymerization reaction that takes place in the aprotic polar solvent. In addition, it was discovered that the azeotrope former that was separated out from the vapor mixture was pure enough to be recycled back to the heated reaction mixture to replenish the azeotrope former that was initially charged into the reactor.

The above discussed and many other features and attendant advantages of the present invention will become better understood by reference to the detailed description.

DETAILED DESCRIPTION OF THE INVENTION

The present invention is an improvement upon the methods disclosed in U.S. Pat. No. 4,789,722 for making amine-terminated polyarylene polyethers having a low Dp. The contents of this patent are hereby specifically incorporated by reference.

The improved method of the present invention is particularly well suited for making large amounts of amine-terminated polyarylene polyethers. The first step involves charging all of the raw materials into a suitable reactor vessel to form a liquid/slurry reaction mixture. Typical reactor vessels will have capacities of up to 3000 gallons or more. Any of the conventional reactor vessels used for industrial scale production of polyarylene polyethers may be used. For example standard glass-lined reactor vessels are suitable. Exemplary glass-lined reactors are available from Pfaudler-Balfour (Leven, Scotland).

The reactor is initially purged with nitrogen or other inert gas to ensure that the atmosphere inside the reactor is essentially free of oxygen. For the purpose of this specification, an oxygen-free atmosphere is one that contains less than 100 ppm. Preferably, the amount of oxygen in the oxygen-free atmosphere is less than 50 ppm.

The liquid/slurry reaction mixture contains an aprotic polar solvent, a weak base, a dihydroxyaromatic compound, a dihaloaromatic compound, an amino-hydroxyaromatic compound, and a non-aromatic azeotrope former that has from 6 to 10 carbon atoms. The ingredients are preferably charged into the reaction vessel in the same order as they are listed in the preceding sentence. After charging of the raw materials, the reactor is again purged with a suitable gas such as nitrogen to ensure that the reactor atmosphere is essentially oxygen free (as previously defined).

The liquid reaction mixture is then heated to a temperature that is sufficient to form a heated reaction mixture and a vapor mixture. Formation of the amine-terminated polyarylene polyether takes place in the heated reaction mixture and the vapor mixture is removed from the reaction vessel as an overhead vapor stream. The temperature of the heated reaction mixture is typically between 100° C. and 150° C. A preferred elevated temperature is about 125° C. The temperature of the overhead vapor stream will range from about 100° C. initially to about 130° C. as the reaction nears completion.

The liquid/slurry reaction mixture is maintained within the elevated temperature range for a sufficient time to form the desired amine-terminated polyarylene polyether. It usually takes from 36 to 72 hours or more at the selected elevated temperature for the reaction to reach completion. This time period will vary depending on the particular azeotrope former used in the reaction mixture. During this period the non-aromatic azeotrope former that is removed from the reaction mixture via the vapor stream is continually replenished. It is preferred that the azeotrope former which is removed in the vapor stream be separated from the water and polar solvent in the vapor mixture and recycled to the reaction vessel. Alternatively, fresh azeotrope former may be added. The important consideration is that a sufficient amount of azeotrope former must be in the reaction mixture to ensure that essentially all of the water that is formed as a by-product is removed from the reaction mixture.

When the polymerization reaction is complete, the azeotrope former and the inorganic salts present in the reactor are separated from the amine-terminated polyarylene polyether and polar solvent. The remaining solution of amine-terminated polyarylene polyether in polar solvent may then be processed according to well-known procedures to isolate thermoplastic materials.

The dihydroxyaromatic compound may be a single dihydroxyaromatic material such as bisphenol A or a combination of dihydroxyaromatic compounds such as a combination of bisphenol A and 2,7-napthalenediol. The dihydroxyaromatic compound may be a mono-nuclear, di-nuclear or polynuclear aromatic compound in which benzene nuclei are fused together or linked through a valence bond or linking group, such as alkylene or alkylidene (e.g., isopropylidene). Examples of such dihydroxyaromatic compounds appear in U.S. Pat. No. 4,108,837. Dihydroxy di-nuclear aromatic compounds such as bisphenol A or biphenol are preferred in making polyarylene polyethers with low Dp and a high glass transition temperature. Other suitable dihydroxyaromatic compounds include resorcinol, bisphenol F, bisphenol S, various dihydroxynaphthalenes, dihydroxyanthracenes, and alkyl, aryl, and halo substituted variations on the aforementioned compounds.

The dihaloaromatic compound may be a single dihaloaromatic material such as 4,4'-dichlorodiphenylsulfone or a combination of dihaloaromatic materials. The dihaloaromatic compound is preferably a di-chloro compound that is a bridged di-nuclear compound such as 4,4'-dichlorodiphenylsulfone or 4,4'-dichlorodiphenyl ketone. Other suitable dihaloaromatic compounds are described in U.S. Pat. No. 4,400,499.

A variety of amino-hydroxyaromatic compounds may be used in making the amine-terminated polyarylene polyethers. Preferred amino-hydroxyaromatic compounds are monoamines such as 3-aminophenol or 4-aminophenol (p-aminophenol). The amino-hydroxyaromatic compound may be substituted by other groups such as lower alkyl groups. The amino-hydroxyaromatic compound may be a single amine or a combination of amines whereby, in the latter case, the resultant amine-terminated polyarylene polyether has more than one type of amine end group.

The weak base is introduced into the reaction mixture as a dry powder or solid. Exemplary weak bases include sodium carbonate and potassium carbonate. Potassium carbonate is preferred. The term "weak base" as used herein is intended to cover bases that are relatively weak in comparison to strong bases, such as potassium hydroxide and sodium hydroxide. In order to qualify as a weak base in accordance with the present invention, it is only necessary that the base be weaker than the strong bases, such as sodium and potassium hydroxide.

The aprotic polar solvent that is used in the reaction mixture is a highly polar organic solvent such as a sulfoxide or sulfone organic solvent. Exemplary polar solvents include dimethylsulfoxide, dimethylsulfone, diethylsulfoxide, diethylsulfone, diisopropylsulfone, tetrahydrothiophene 1,1'-dioxide (also known as tetramethylene sulfone or sulfolane) and tetrahydrothiophene-1 monoxide. Dimethylsulfoxide (DMSO) is the preferred polar solvent. Blends of the above solvents may be used, if desired The non-aromatic azeotrope former is preferably octane. However, other saturated hydrocarbon compounds containing from 6 to 10 carbon atoms may be used provided that they are immiscible with the polar solvent and are capable of forming an azeotrope with the water generated during the polymerization reaction. Examples of such compounds include heptane, nonane, cyclohexane, cycloheptane, cyclooctane, and lower alkyl-substituted derivatives of the aforementioned compounds, such as trimethylcyclohexane.

The relative amounts of starting ingredients that are charged to the reactor may be varied to achieve the optimum yield of polymer product. Further, the ratios of the starting ingredients are varied in order to control the degree of polymerization (Dp) and hence the molecular weight of the polyarylene polyether formed in the reaction. In general, the amounts of starting ingredients should be within the following ranges:

2 to 12 parts by weight dihydroxyaromatic compound;
4 to 14 parts by weight dihaloaromatic compound;
0.1 to 1 parts by weight amino-hydroxyaromatic compound;
4 to 14 parts by weight weak base;
50 to 69 parts by weight aprotic polar solvent; and
5 to 15 parts by weight non-aromatic azeotrope former.

A preferred reaction mixture includes the following amounts of starting ingredients:

7 parts by weight dihydroxyaromatic compound;
9 parts by weight dihaloaromatic compound;
0.6 parts by weight amino-hydroxyaromatic compound;
9 parts by weight weak base;
64 parts by weight aprotic polar solvent; and
10 parts by weight non-aromatic azeotrope former.

A preferred reaction mixture contains:
Bisphenol A as the dihydroxyaromatic compound;
dichlorodiphenylsulfone as the dihaloaromatic compound;
p-aminophenol as the amino-hydroxyaromatic compound;
potassium carbonate as the weak base;
dimethylsulfoxide as the aprotic polar solvent ; and
octane as the non-aromatic azeotrope former.

Examples of practice are as follows:

The following ingredients are charged into a 1000 gallon glass-lined reactor with overheads for removing the vapor mixture generated during the reaction:

2500 pounds of dimethylsulfoxide;
350 pounds of potassium carbonate;
260 pounds of bisphenol A;
374 pounds of dichlorodiphenylsulfone
35.0 pounds of p-aminophenol; and
400 pounds of octane.

All weights are plus or minus 1 pound except for the p-aminophenol which is plus or minus 0.5 pounds. The order of addition of the ingredients into the reactor is as shown in the above list. The reactor is flushed with nitrogen prior to addition of the ingredients. After the addition of the octane, the reactor is purged with nitrogen to reduce the oxygen level in the reactor atmosphere to less than 50 ppm. Alternatively, the reactor can be purged with nitrogen prior to the addition of the octane provided that the octane is pumped into a closed reactor and no oxygen is introduced during the transfer.

After all of the raw materials are added to the reactor and the reactor has been purged with nitrogen, heat is applied to the reactor and the reaction is brought to a gentle reflux. The reactor contents should be at a temperature of approximately 125° C. at reflux. The reflux does not need to be vigorous, just steady. A mixture of water/DMSO will separate from the octane in the overhead decanter. Octane is returned to the reactor. The temperature of the overhead vapor stream will range from about 110° C. initially to about 122° C. as the reaction nears completion.

The reaction mixture should be sampled at 24 and 48 hours for Dp of the polyarylene polyether. At 60 hours, the reaction mixture should again be sampled for Dp. If the Dp is within plus or minus 0.4 Dp units of the target Dp, then an analysis for the residual organic chlorine (Cl) is also run. The target Dp for this example is 7.0. If the residual Cl analysis shows less than 0.035 meq/g of Cl, then the hydroxyl and amine end group analyses should be run to determine the degree of amine-termination for the product. If the amine termination is within desired limits, the reaction is considered to be complete. Typically, the amine-termination should be about 75% or higher.

Once the reaction is determined to be complete, the return of octane to the reactor is discontinued. Instead, octane is held in an overhead receiver. A slight vacuum is applied to reaction vessel and the remainder of the octane is stripped from the reactor. Octane is not miscible with the DMSO reaction mixture and care must be used to determine when the octane has been completely removed from the reactor. Achieving a reaction mixture temperature of 125° C. at a vacuum of 20 inches is a relatively accurate indication that the removal of the octane from the reactor is essentially complete. The recovered octane has been found to be very pure and is acceptable for use in the next production batch.

Once the octane has been removed from the reaction mixture, the mixture contains the amine-terminated polyarylene polyether dissolved in DMSO as well as a significant amount of salts (KCl and residual potassium carbonate). The polyarylene polyether solution is diluted with DMSO in order to aid filtration through a Nutsche filter. The salt cake remaining on the Nutsche filter is washed with fresh DMSO. This wash is added to the original filtrate containing the bulk of the desired polymer. DMSO is then stripped from the polymer solution (using heat and vacuum) to yield an approximately 32 weight percent solution of amine-terminated polyarylene polyether in DMSO. Subsequent coagulation and isolation of the polymer from the DMSO is accomplished using well-known standard procedures.

In similar fashion, into a 5 liter reaction flask equipped with mechanical stirring, condenser, dean-stark trap, thermometer, nitrogen purge, and a heating mantle, was charged:

| | |
|---|---|
| Dimethylsulfoxide | 2500 grams |
| Potassium Carbonate | 350 grams |
| Bisphenol A | 260 grams |
| Dichlorodiphenylsulfone | 362 grams |
| p-Aminophenol | 26.2 grams |
| Octane | 400 grams. |

This mixture was heated at reflux intermittently for a total of 94 hours (reaction was turned off periodically) and water was removed from the reaction via the dean-stark trap. At the end of 94 hours the polyarylene polyether produced was analyzed and found to have a Dp of 9.48. The target Dp was 9.5. The residual organic chlorine was found to be 0.006 meq/g. The amine end-group concentration was found to be 0.3113 meq/g and the hydroxyl end-group concentration was found to be 0.0181 meq/g. This represents an amine termination of approximately 93%.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A method for making an amine-terminated polyarylene polyether comprising the steps of:
   forming a liquid/solid slurry reaction mixture in an oxygen-free atmosphere, said reaction mixture consisting essentially of a dihydroxyaromatic compound, a dihaloaromatic compound, an amino-hydroxyaromatic compound, a weak base, an aprotic polar solvent and a non-aromatic azeotrope former which has from 6 to 10 carbon atoms and is substantially non-miscible with the aprotic polar solvent;
   heating said liquid/solid slurry reaction mixture to an elevated temperature that is sufficient to form a heated reaction mixture and a vapor mixture consisting essentially of said aprotic polar solvent, water, and said non-aromatic azeotrope former;
   separating said vapor mixture from said heated reaction mixture;
   replenishing said heated reaction mixture with said non-aromatic azeotrope former:
   maintaining said heated reaction mixture at said elevated temperature for a time that is sufficient to form a product mixture that comprises said amine-terminated polyarylene polyether, said aprotic polar solvent and said non-aromatic azeotrope former;
   separating said non-aromatic azeotrope former and any solid salts from said product mixture to provide a solution of said amine-terminated polyarylene polyether in said aprotic polar solvent.

2. A method for making an amine-terminated polyarylene polyether according to claim 1 wherein said dihydroxyaromatic compound is selected from the group consisting of bisphenol-A, bisphenol F, bisphenol S, bisphenol C, resorcinol, a dihydroxynaphthalene, 4,4'-biphenol, hexafluorobisphenol A, and halo- and alkyl derivatives of said dihydroxyaromatic compounds.

3. A method for making an amine-terminated polyarylene polyether according to claim 1 wherein said dihaloaromatic compound is selected from the group consisting of dichlorodiphenylsulfone and dichlorodiphenylketone.

4. A method for making an amine-terminated polyarylene polyether according to claim 1 wherein said amino-hydroxyromatic compound is selected from the group consisting of p-aminophenol, m-aminophenol, or aminonaphthol.

5. A method for making an amine-terminated polyarylene polyether according to claim 1 wherein said weak base is selected from the group consisting of sodium carbonate and potassium carbonate.

6. A method for making an amine-terminated polyarylene polyether according to claim 1 wherein said aprotic polar solvent is selected from the group consisting of dimethylsulfoxide, dimethylsulfone, diethylsulfoxide, diethylsulfone, diisopropylsulfone, tetrahydrothiophene 1,1'-dioxide, tetrahydrothiophene-1 monoxide and blends thereof.

7. A method for making an amine-terminated polyarylene polyether according to claim 1 wherein said non-aromatic azeotrope former is selected from the group consisting of heptane, octane, nonane, decane, cyclohexane, cycloheptane, cyclooctane, and lower alkyl derivatives of these compounds such that the total number of carbon atoms in the compound is from six to ten.

8. A method for making an amine-terminated polyarylene polyether according to claim 1 wherein said dihydroxyaromatic compound is bisphenol A, said dihaloaromatic compound is dichlorodiphenylsulfone, said amino-hydroxyaromatic compound is p-aminophenol, said weak base is potassium carbonate, said aprotic polar solvent is dimethylsulfoxide and said non-aromatic azeotrope former is octane.

9. A method for making an amine-terminated polyarylene polyether according to claim 7 wherein said non-aromatic azeotrope former is trimethylcyclohexane.

10. A method for making an amine-terminated polyarylene polyether according to claim 1 wherein said elevated temperature is between 120° C. and 135° C.

11. A method for making an amine-terminated polyarylene polyether according to claim 1 that includes the additional step of separating said non-aromatic azeotrope former from said aprotic polar solvent and said water in said vapor mixture to form a recyclable azeotrope former.

12. A method for making an amine-terminated polyarylene polyether according to claim 11 that includes the step of replenishing said reaction mixture with said recyclable azeotrope former.

13. A method for making an amine-terminated polyarylene polyether according to claim 1 wherein said liquid/solid slurry reaction mixture includes from 2 to 12 parts by weight of said dihydroxyaromatic compound, from 4 to 14 parts by weight of said dihaloaromatic compound, from 0.1 to 1 parts by weight of said amino-hydroxyaromatic compound, from 4 to 14 parts by weight of said weak base, from 50 to 69 parts by weight of said aprotic polar solvent and from 5 to 15 parts by weight of said non-aromatic azeotrope former.

14. A method for making an amine-terminated polyarylene polyether according to claim 13 wherein said dihydroxyaromatic compound is bisphenol A, said dihaloaromatic compound is dichlorodiphenylsulfone, said amino-hydroxyaromatic compound is p-aminophenol, said weak base is potassium carbonate, said aprotic polar solvent is dimethylsulfoxide and said non-aromatic azeotrope former is octane.

15. A method for making an amine-terminated polyarylene polyether according to claim 14 wherein said liquid/solid slurry reaction mixture includes about 7 parts by weight of said dihydroxyaromatic compound, about 9 parts by weight of said dihaloaromatic compound, about 0.6 parts by weight of said amino-hydroxyaromatic compound, about 9 parts by weight of said weak base, about 64 parts by weight of said aprotic polar solvent and about 10 parts by weight of said non-aromatic azeotrope former.

* * * * *